United States Patent [19]

Watanabe et al.

[11] Patent Number: 5,760,141
[45] Date of Patent: Jun. 2, 1998

[54] PROPYLENE BLOCK COPOLYMER, PROCESS FOR PREPARATION THEREOF AND PROPYLENE RESIN COMPOSITION COMPRISING SAME

[75] Inventors: Kazuyuki Watanabe; Hisayoshi Yanagihara, both of Oita, Japan

[73] Assignee: Japan Polyolefins Co., Ltd., Tokyo, Japan

[21] Appl. No.: 672,045

[22] Filed: Jun. 26, 1996

[30] Foreign Application Priority Data

| Jun. 26, 1995 | [JP] | Japan | 7-159556 |
| Aug. 1, 1995 | [JP] | Japan | 7-196701 |
| Aug. 8, 1995 | [JP] | Japan | 7-202482 |

[51] Int. Cl.$^6$ ............... C08L 23/00; C08F 210/00
[52] U.S. Cl. ............... 525/323; 525/89; 525/98; 524/505
[58] Field of Search ............... 525/89, 98, 323; 524/505

[56] References Cited

FOREIGN PATENT DOCUMENTS

| 0457455 | 4/1991 | European Pat. Off. |
| 0702038 | 9/1995 | European Pat. Off. |
| 4242056 | 6/1994 | Germany. |
| 4426569 | 3/1995 | Germany. |

OTHER PUBLICATIONS

Macromolecular Rapid Communications, vol. 15, 1995, Zug, CH, pp. 247–252, "Synthesis of polypropene–block–poly(ethylene–co–propene) by short–period polymerization with MgCl2–supported Ziegler catalyst".

*Primary Examiner*—Mark L. Warzel
*Attorney, Agent, or Firm*—Sughrue, Mion, Zinn, Macpeak & Seas, PLLC

[57] ABSTRACT

A propylene block copolymer, a process for preparation of the propylene block copolymer, and a propylene resin composition comprising the propylene block copolymer. The propylene block copolymer comprises (a) from 35 to 95% by weight of a polypropylene block and (b) from 10 to 65% by weight of a block of a copolymer of a propylene and other α-olefins, the propylene block copolymer having: (i) in a crystallization temperature curve determined by a differential scanning calorimeter, besides a main peak, secondary peaks in a temperature range of from 90° to 100° C., and a proportion of the area of the secondary peaks to that of a main peak of from 1.5 to 10%; and (ii) a relationship between an amount of a soluble content on xylene extraction at 25° C. and a proportion of the area of the secondary peaks to that of the main peak represented by equation (I):

$$0.1 X_{IS} - 1 \leq SMA \tag{I}$$

wherein $X_{IS}$ represents an amount of a soluble content on xylene extraction at 25° C. in terms of percent by weight; and SMA represents a proportion of the area of the secondary peaks to that of the main peak in terms of percent.

9 Claims, 3 Drawing Sheets

PROPYLENE BLOCK COPOLYMER, PROCESS FOR PREPARATION THEREOF AND PROPYLENE RESIN COMPOSITION COMPRISING SAME

FIELD OF THE INVENTION

The present invention relates to a propylene block copolymer having well-balanced rigidity and impact resistance as well as excellent flexibility, whitening resistance, mechanical strength, and surface gloss, which can find good application to machine parts, electrical parts, electronic parts, wrapping material, substitute for engineering plastic, etc.

The present invention also relates to a polypropylene resin composition having well-balanced rigidity and impact resistance and excellent in external appearance such as gloss and flow mark, which can find good application to fields requiring high impact strength particularly at low temperatures such as industrial material, household appliance parts, automobile parts (e.g., soft bumper) and wrapping material.

BACKGROUND OF THE INVENTION

Propylene block copolymers are widely used as polypropylene resins having an improved impact resistance in the field of automobile, household appliance and wrapping material. These copolymers are generally produced by a multi-stage polymerization process which comprises the production of a propylene at a first stage, followed by the copolymerization of the propylene with other α-olefins at a second and following stages. Ethylene is generally used as the α-olefin.

In addition to the foregoing polymerization process, another polymerization has been proposed (as disclosed in JP-A-50-14265 (The term "JP-A" as used herein means an "unexamined published Japanese patent application"), JP-A-52-98045, JP-A-53-88049, JP-A-55-66939, P. Galli, *Macromol. Symp.*, vol. 78, pp. 269 to 284 (1994)). In this polymerization process, ethylene is further polymerized at a third stage for the purpose of improving rigidity, impact resistance and whitening resistance.

However, the conventional propylene block copolymers are disadvantageous in that the products formed from these copolymers have a remarkable surface roughness and hence a poor gloss. The conventional propylene block copolymers also have a large haze and hence a poor transparency.

The conventional propylene block copolymers have another problem that when the α-olefin content in the copolymers is increased to improve rigidity and impact resistance, the reactor is blocked upon polymerization. For example, when AA type titanium trichloride and diethylaluminum chloride catalysts are used, the upper limit of the copolymerizable α-olefin content is 25% by weight.

In order to improve rigidity, heat resistance and impact resistance, which are important requirements in the field of automobile parts, many compositions comprising a soft elastomer such as ethylene propylene rubber (EPR, EPDM) or ethylene butene rubber (EBR) and an inorganic filler such as talc incorporated therein have been proposed (as disclosed in JP-A-57-12046, JP-A-57-55952, JP-A-61-233048, JP-A-1-204947).

However, the foregoing approach is disadvantageous in that the realization of desired properties requires the rise in the added amount of the soft elastomer that causes a remarkable deterioration of rigidity and heat resistance. The foregoing approach is also economically disadvantageous in that it requires much production cost.

SUMMARY OF THE INVENTION

It is therefore an object of the present invention to provide a propylene block copolymer excellent in mechanical strength such as impact resistance and rigidity, whitening resistance, surface hardness, heat resistance and surface gloss.

It is another object of the present invention to provide a polypropylene resin composition having well-balanced rigidity and impact resistance and excellent in external appearance such as gloss and flow mark.

These and other objects of the present invention will become more apparent from the following detailed description and examples.

The inventors made extensive studies. As a result, it was found that the foregoing objects of the present invention can be accomplished with a propylene block copolymer having specific physical properties. The present invention has been worked out on the basis of this knowledge.

The present invention relates to, as a first embodiment, a propylene block copolymer comprising (a) from 35 to 95% by weight of a polypropylene block and (b) from 5 to 65% by weight of a block of a copolymer of a propylene and other α-olefins, said propylene block copolymer having:

(i) in a crystallization temperature curve determined by a differential scanning calorimeter, besides a main peak, secondary peaks in a temperature range of from 90° to 100° C., and a proportion of the area of said secondary peaks to that of a main peak of from 1.5 to 10%; and (ii) a relationship between an amount of a soluble content on xylene extraction at 25° C. and a proportion of the area of said secondary peaks to that of said main peak represented by equation (I):

$$0.1 X_{IS} - 1 \leq SMA \tag{I}$$

wherein $X_{IS}$ represents an amount of a soluble content on xylene extraction at 25° C. in terms of percent by weight; and SMA represents a proportion of the area of said secondary peaks to that of said main peak in terms of percent.

The present invention also relates to, as a second embodiment, a propylene resin composition comprising (A) from 80 to 99% by weight of the propylene block copolymer of the first embodiment of the present invention, provided that the proportions of the propylene block (a) and the a block of a copolymer of a propylene and other α-olefins are not limited, and (B) from 1 to 20% by weight of a soft elastomer.

The present invention further relates to, as a third embodiment, a propylene resin composition comprising (A) from 50 to 98% by weight of the propylene block copolymer of the first embodiment of the present invention, provided that the proportions of the propylene block (a) and the a block of a copolymer of a propylene and other α-olefins are not limited, (B) from 1 to 20% by weight of a soft elastomer, and (C) from 1 to 30% by weight of an inorganic filler.

BRIEF DESCRIPTION OF THE DRAWINGS

By way of example and to make the description more clear, reference is made to the accompanying drawings in which.

DETAILED DESCRIPTION OF THE INVENTION

The propylene block copolymer (hereinafter referred to as "BPP") (A) according to the present invention comprises (a) a polypropylene block and (b) a block of a propylene and other α-olefins. Examples of the polypropylene (a) include homopolypropylene and random copolymer of propylene and other α-olefins (copolymerization proportion of α-olefin: less than 20 mol %).

Examples of the copolymer block (b) include random copolymer of propylene and other α-olefins (copolymerization proportion of α-olefin: not less than 5 mol %). The content of α-olefin in the component (b) is generally from 30 to 80 mol %, preferably from 32 to 78 mol %, and particularly preferably from 35 to 75 mol %.

Examples of the foregoing other α-olefins include α-olefins having 2 to 12 carbon atoms (excluding those having 3 carbon atoms). Specific examples of such other α-olefins include ethylene, 1-butene, 3-methyl-1-butene, 3-methyl-1-pentene, 4-methyl-1-pentene, 4,4-dimethyl-1-pentene, vinylcyclopentane, and vinylcyclohexane. These α-olefins may be used singly or in combination.

The proportion of the component (b) in BPP (A) of the first embodiment of the present invention is generally from 5 to 65% by weight, preferably from 7 to 63% by weight, and particularly preferably from 10 to 62% by weight. That is, the proportion of the component (a) in BPP is generally from 35 to 95% by weight, preferably from 37 to 93% by weight, and particularly preferably from 38 to 90% by weight. If the proportion of the component (b) falls below 5% by weight, the resulting copolymer exhibits a reduced impact resistance. If the proportion of the component (b) exceeds 65% by weight, the resulting formed product becomes sticky or exhibits a reduced mechanical strength.

In the resin compositions according to the second and third aspect of the present invention, the proportions of the propylene block (a) and the a block of a copolymer of a propylene and other α-olefins (b) are not limited.

BPP of the present invention needs to have the following physical properties:

(i) The crystallization temperature curve determined by a differential scanning calorimeter has secondary peaks in the temperature range of 90° C. to 100° C., besides main peak, and the proportion of the area of the secondary peaks to that of the main peak is from 1.5 to 10%; and (ii) The soluble content on xylene extraction at 25° C. and the proportion of the area of the secondary peaks to that of the main peak satisfy the relationship represented by equation (I):

$$0.1X_{IS}-1 \leq SMA \quad (I)$$

Figure 1:
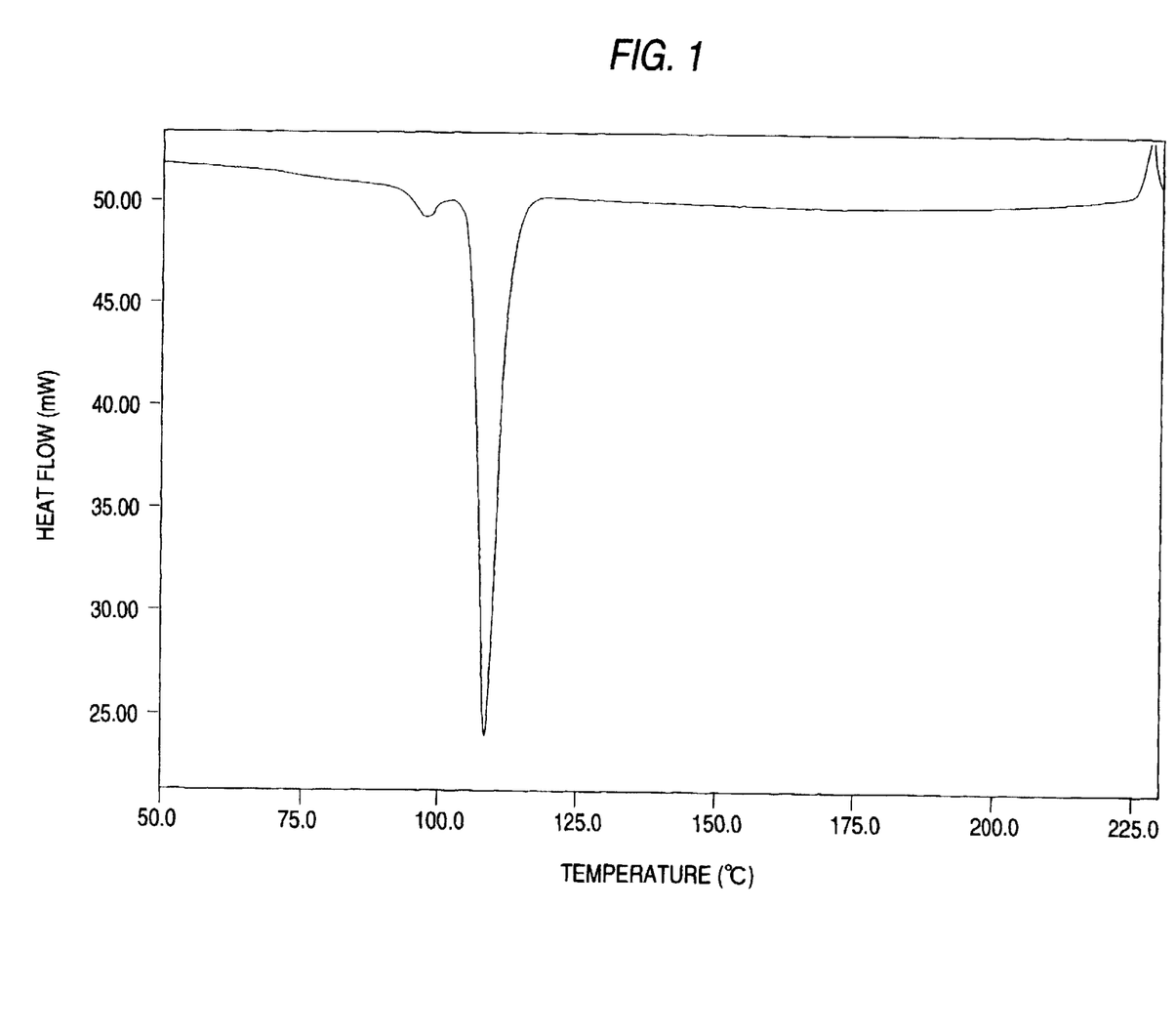
FIG. 1 illustrates an example of DSC crystallization temperature curve of a propylene block copolymer according to the present invention.

The crystallization temperature curve determined by a differential scanning calorimeter (DSC) can be obtained by heating BPP to 230° C. where it is then kept for 5 minutes, and then cooling the BPP to –30° C. at a rate of 20° C./min. The crystallization temperature curve thus determined needs to have secondary peaks in the temperature range of from 90° C. to 100° C. (requirement (i)). An example of the crystallization temperature curve of BPP of the present invention is shown in FIG. 1.

The temperature range in which the secondary peaks appear is preferably from 91° C. to 99° C., and particularly preferably from 92° C. to 98° C. If the secondary peaks appear at a temperature of lower than 90° C., the effect of improving the surface gloss is not sufficient. If the secondary peaks appear at a temperature of higher than 100° C., the impact resistance and surface gloss are impaired.

The proportion of the area of the secondary peaks to that of the main peak (hereinafter referred to as "SMA") is from 1.5 to 10%, preferably from 1.8 to 9%, and particularly preferably from 2.0 to 8%. If SMA falls below 1.5%, it exerts no effect of improving rigidity, whitening resistance and surface gloss. If SMA exceeds 10%, the impact resistance and surface gloss are impaired.

Further, SMA and the soluble content on xylene extraction at 25° C. (hereinafter referred to as "$X_{IS}$") need to satisfy the following relationship (I) (requirement (ii)):

$$0.1X_{IS}-1 \leq SMA \quad (I)$$

wherein $X_{IS}$ represents a soluble content on xylene extraction at 25° C. (% by weight), and SMA represents the percent proportion of the area of the secondary peaks to that of the main peak.

The relationship (I) between an amount of a soluble content on xylene extraction at 25° C. and a proportion of the area of said secondary peaks to that of said main peak is preferably $$0.1X_{IS}-1.8 \leq SMA$$

particularly preferably $$0.23X_{IS}-2.3 \leq SMA$$

If SMA does not satisfy the relationship (I), the desired effect of improving the various properties cannot be exerted.

In the present invention, the 135° C. decalin (decahydronaphthalene) intrinsic viscosity [η] of the soluble content on xylene extraction at 25° C. is preferably from 1.0 to 6.0 l/g. In particular, if BPP has a 135° C. decalin (decahydronaphthalene) intrinsic viscosity [η] of from 1.0 to 4.0 dl/g, the resulting copolymer exhibits improvements in optical properties such as transparency and gloss without impairing low temperature impact strength.

In BPP of the present invention, the soluble content on xylene extraction at 25° C. preferably has the following physical properties:

(iii) an average propylene content (FP) according to the two-site model of from 30 to 70% by mole;

(iv) a propylene content ($P_P$) of a copolymer ($P_H$) formed at an active site, at which propylene is predominantly polymerized in the two-site model, of from 50 to 80% by mole;

(v) a proportion of said copolymer ($P_H$) in said soluble content on xylene extraction of from 0.20 to 0.60; and (vi) a block property (CSD) of from 1.0 to 2.5.

Figure 2:
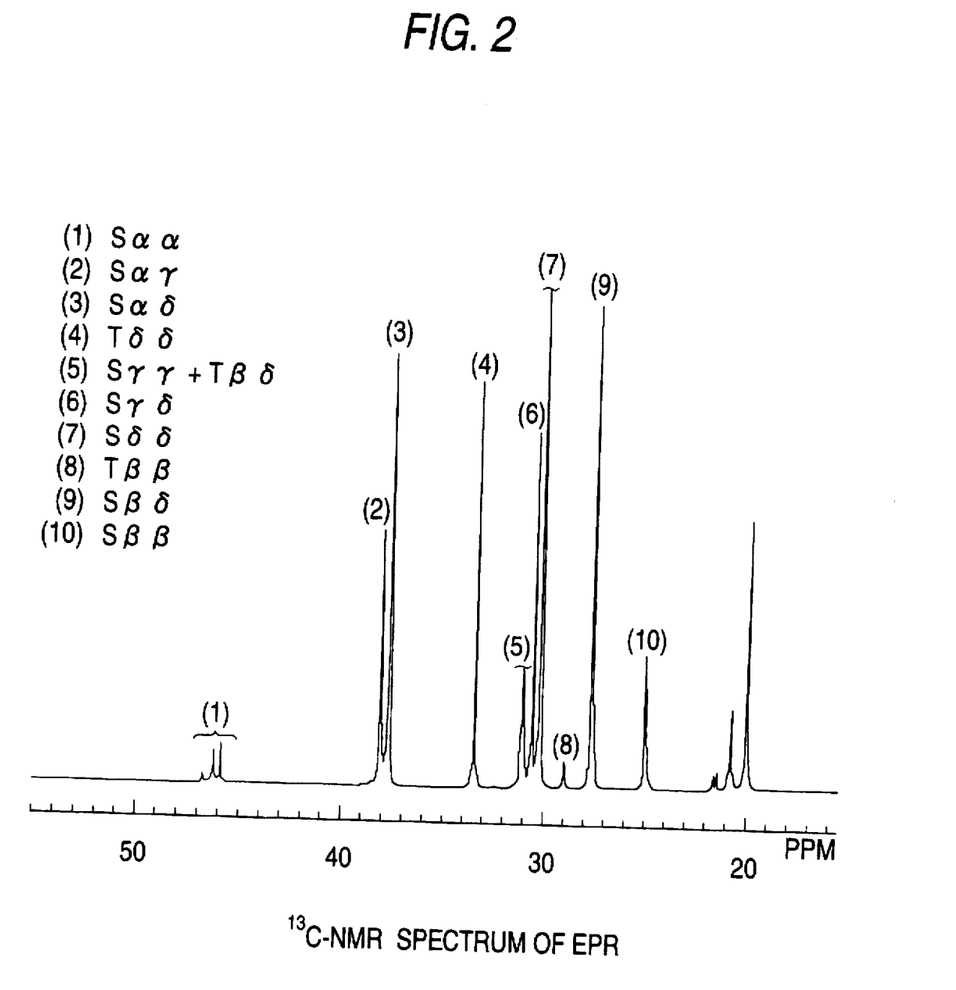
FIG. 2 illustrates an example of nuclear resonance spectrum of a propylene-ethylene copolymer.

The two-site model of BPP of the present invention will be further described hereinafter taking as an example the case where the component (b) is a propylene-ethylene copolymer. FIG. 2 illustrates $^{13}$C-NMR spectrum of a typical propylene-ethylene copolymer. The spectrum shows 10 different peaks developed by the difference in chain distribution (arrangement of ethylene and propylene). The nomenclature of chain is further described in Carman, C. J.

Figure 3:
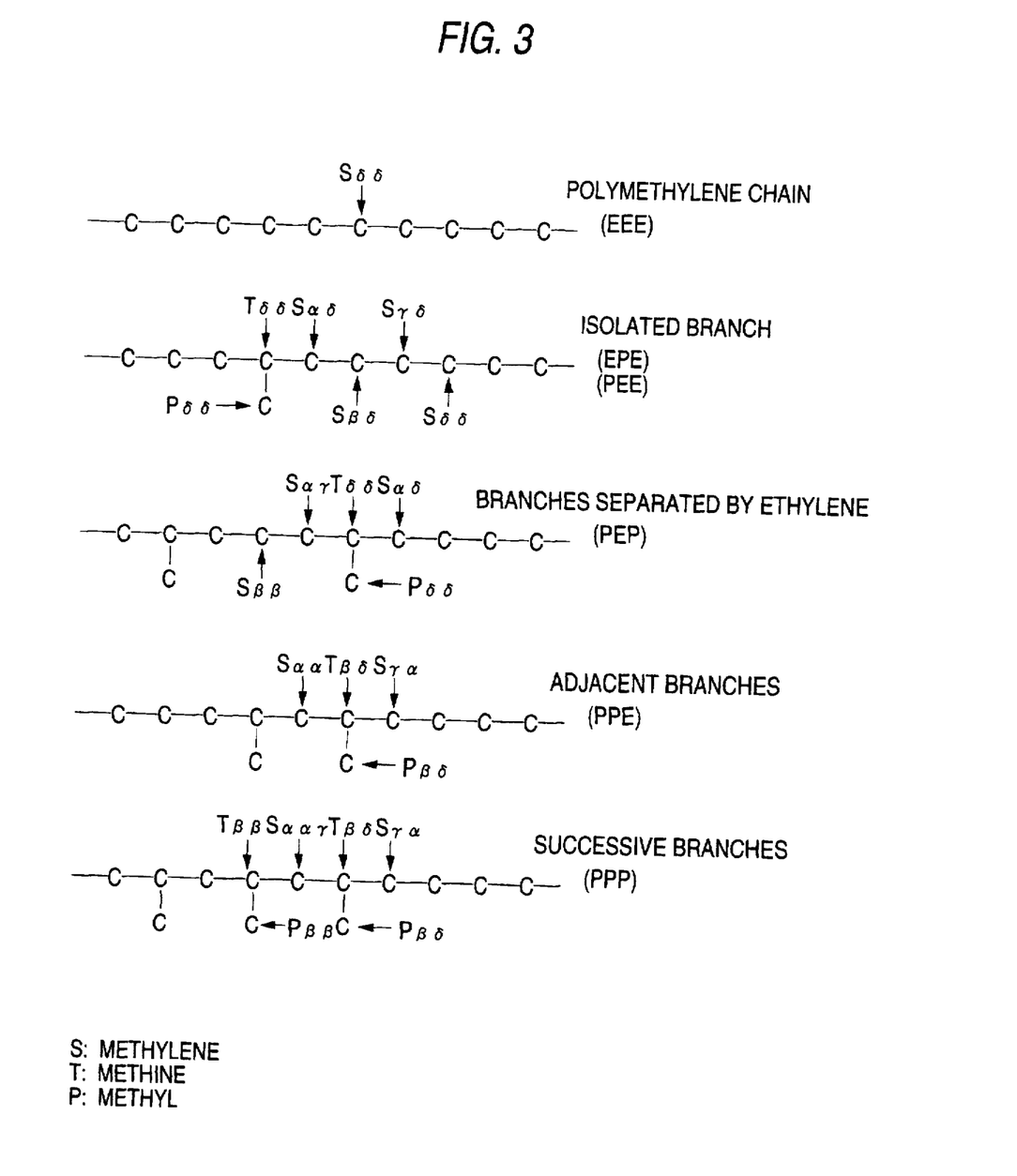
FIG. 3 illustrates an example of nomenclature of various carbon atoms derived from the chain distribution of a propylene-ethylene copolymer.

Horrington, R. A. Wilkes, C. E., *Macromolecules*, vol. 10, pp. 536 to 544 (1977). These chains are termed as set forth in FIG. 3. Assuming a copolymerization reaction mechanism, these chains can be represented as reaction probability (P). Accordingly, assuming that the entire peak intensity is 1, the relative intensity of the various peaks (1) to (10) can be represented as probability equation by Bernoulli's statistics with P as a parameter.

For example, in the case of (1) $S\alpha\alpha$, assuming that the propylene unit is represented by symbol p and the ethylene unit is represented by symbol e, there are three possible chains [pppp], [ppee] and [eppe]. These chains are each represented by reaction probability that are then totalled. The remaining peaks (2) to (10) are similarly processed to make equations. The probability equation can be determined by optimizing P such that these ten equations and the measured peak intensities are closest to each other.

The block property (CSD) indicates the reactivity ratio of ethylene to propylene. The definition of block property is described in *Copolymerization 1: Reaction Analysis*, pp. 5 to 13, compiled by Polymer Association Japan, Baifukan, 1975. The calculation was conducted in accordance with the method described in Soga, K. Park, J. R. Shiono, T, *Polymer Communications*, Vol. 32, No. 10, page 310, 1991. In some detail, CSD was determined from the intensity ratio shown in FIG. 2 by the following equation:

$$(CSD) = [(0.5 \times (7) + 0.25 \times (6) + 0.5 \times (3)) \times (1)] / [0.5 \times ((2) + (3))]^2$$

FP (iii) thus obtained is preferably from 30 to 70 mol %, more preferably from 35 to 65 mol %. $P_p$ (iv) is preferably from 50 to 80 mol %, more preferably from 55 to 75 mol %. $P_{fl}$ (v) is preferably from 0.20 to 0.60, more

TABLE 6

|  | BPP (A) Kind/ Amount (wt %) | EPR (B) Kind/ Amount (wt %) | Film impact strength 23° C./-5° C. (kg-cm/mm) | Tensile modulus MD/TD (kg/cm$^2$) | Heat sealing characteristics (°C.) |
|---|---|---|---|---|---|
| Example 15 | BPP1/90 | EPR2/10 | 328/208 | 8,400/8,000 | 140 |
| Comparative Example 5 | BPP7/80 | EPR1/20 | 252/92 | 6,400/5,500 | 155 |

The two-site model is used to assume this reaction mechanism. The definition of two-site model is described in H. N. Cheng, *Journal of Applied Polymer Science*, Vol. 35, pp. 1639 to 1650 (1988). In other words, in a model of copolymerization of propylene and ethylene in the presence of a nonuniform catalyst, assuming the propylene content ($P_p$) in the copolymer ($P_H$) produced at an active point where propylene is preferentially polymerized and the propylene content ($P'_p$) in the copolymer ($P_H$) produced at an active point where ethylene is preferentially polymerized, with the proportion ($P_{fl}$) of $P_H$ in the copolymer as a parameter, probability equations set forth in Table 1 can be obtained.

preferably from 0.25 to 0.55. CSD (vi) is preferably from 1.0 to 2.5, more preferably from 1.3 to 2.0.

An example of the method for obtaining BPP of the present invention is a method which comprises the polymerization in the presence of a modified polymerization catalyst having the following physical properties obtained by treating a solid catalyst comprising as essential components a magnesium compound, a titanium compound, a halogen-containing compound and an electron donor compound with a titanium compound represented by the general formula TiXa·Yb (in which X represents a halogen atom such as Cl, Br and I, Y represents an electron donor compound, a represents an integer of 3 or 4, and b represents an integer of not more than 3), washing the solid catalyst with a halogen-containing compound, and then washing the solid catalyst with a hydrocarbon.

TABLE 1

| Signal | Probability equation for two-site model |
|---|---|
| (1) $S\alpha\alpha$ | $P_p^2 \times P_{fl} + P_p'^2 \times (1 - P_{fl})$ |
| (2) $S\alpha\gamma$ | $(-2P_p^3 + 2P_p^2) \times P_{fl} + (-2P_p'^3 + 2P_p'^2) \times (1 - P_{fl})$ |
| (3) $S\alpha\delta$ | $(2P_p^3 - 4P_p^2 + 2P_p) \times P_{fl} + (2P_p'^3 - 4P_p'^2 + 2P_p') \times (1 - P_{fl})$ |
| (4) $T\delta\delta$ | $(P_p^3 - 2P_p^2 + P_p) \times P_{fl} + (P_p'^3 - 2P_p'^2 + P_p') \times (1 - P_{fl})$ |
| (5) $S\gamma\gamma + T\beta\delta$ | $(P_p^4 - 4P_p^3 + 3P_p^2) \times P_{fl} + (P_p'^4 - 4P_p'^3 + 3P_p'^2) \times (1 - P_{fl})$ |
| (6) $S\gamma\delta$ | $(-2P_p^4 + 6P_p^3 - 6P_p^2 + 2P_p) \times P_{fl} + (-2P_p'^4 + 6P_p'^3 - 6P_p'^2 + 2P_p') \times (1 - P_{fl})$ |
| (7) $S\delta\delta$ | $(P_p^4 - 5P_p^3 + 9P_p^2 - 7P_p + 2) \times P_{fl} + (P_p'^4 - 5P_p'^3 + 9P_p'^2 - 7P_p' + 2) \times (1 - P_{fl})$ |
| (8) $T\beta\beta$ | $P_p^3 \times P_{fl} + P_p'^3 \times (1 - P_{fl})$ |
| (9) $S\beta\delta$ | $(2P_p^3 - 4P_p^2 + 2P_p) \times P_{fl} + (2P_p'^3 - 4P_p'^2 + 2P_p') \times (1 - P_{fl})$ |
| (10) $S\beta\beta$ | $(-P_p^3 + P_p^2) \times P_{fl} + (-P_p'^3 + P_p'^2) \times (1 - P_{fl})$ |

The foregoing physical properties can be determined by optimizing three parameters $P_p$, $P'_p$ and $P_{fl}$ such that the relative intensity in $^{13}$C-NMR spectrum coincides with the probability equation shown in Table 1.

The average propylene content (FP) in BPP of the present invention can be determined by the following equation using the foregoing three parameters:

$$FP = P_p \times P_{fl} + P'_p \times (1 - P_{fl})$$

Such a modified polymerization catalyst may be prepared from a magnesium compound, a titanium compound, a halogen-containing compound, and an electron donor compound.

Preferred examples of the magnesium compound include halogenated magnesium such as magnesium chloride, magnesium bromide and magnesium iodide, and alkoxymagnesium such as dimethoxymagnesium, diethoxymagnesium, dipropoxymagnesium, dibutoxymagnesium and diphenoxymagnesium. Further, magnesium compounds capable of forming a halogenated magnesium during the formation of catalyst may be used. These magnesium compounds may be used singly or in combination.

Preferred examples of the titanium compound include halogenated titanium such as titanium tetrachloride, titanium trichloride, titanium tetrabromide and titanium tetraiodide. These titanium compounds may be used singly or in combination.

Examples of the halogen atom constituting the halogen-containing compound include fluorine, chlorine, bromine, and iodine. Preferred among these halogen atoms is chlorine. Specific examples of the halogen-containing compound include halogenated titanium such as titanium tetrachloride, halogenated silicon such as silicon tetrachloride and silicon tetrabromide, and halogenated phosphorus such as phosphorus trichloride and phosphorus pentachloride, though depending on the process for the preparation of catalyst. Halogenated hydrocarbons, halogen molecules and halogenated hydro-acids may be used depending on the process for the preparation of catalyst.

As the electron donor compound there may be generally used an oxygen-containing compound, nitrogen-containing compound, phosphorus-containing compound, sulfur-containing compound, silicon-containing compound or the like.

Specific examples of such an electron donor compound include alcohol, phenol, ketone, aldehyde, organic acid ester, alkoxyester, ketoester, inorganic ester, ether, amide, organic acid halide, organic acid anhydride, amine, nitrile, thioether, sulfuric acid ester, sulfonic acid, and silicon-containing compound. Particularly preferred among these electron donor compounds is organic acid ester. Specific examples of such an organic acid ester include phthalic acid ester such as ethyl phthalate, butyl phthalate and 2-ethylhexyl phthalate. These electron donor compounds may be used singly or in combination.

The content of the foregoing various components are arbitrary so far as the effects can be recognized in the present invention. In general, the following ranges are preferred. The amount of the titanium compound to be used is preferably from 0.0001 to 1,000 by mol, more preferably from 0.01 to 100 by mol, of the amount of the magnesium compound to be used. The amount of the halogen compound, if used as necessary, is preferably from 0.01 to 1,000 mols, more preferably from 0.1 to 100 mols per mol of the magnesium compound used.

The amount of the electron donor compound to be used is preferably from 0.001 to 10 mols, more preferably from 0.01 to 5 mols per mol of the magnesium compound used.

As the method for the preparation of the solid catalyst employable herein there may be used a conventional method for the preparation of a solid catalyst which comprises allowing a magnesium compound, a titanium compound, an electron donor compound, and optionally an auxiliary such as halogen-containing compound to undergo catalytic reaction temporarily or by stages.

Specific examples of such a known preparation method will be given below.

(1) Method which comprises allowing a halogenated magnesium compound and optionally an electron donor compound and a titanium compound to come into contact with each other (2) Method which comprises allowing a halogenated magnesium compound, a tetraalkoxytitanium and a specific polymer silicon compound to come into contact with each other to obtain a solid component, and then allowing the solid component to come into contact with a halogenated titanium compound and/or silicon halide (3) Method which comprises dissolving a magnesium compound with a tetraalkoxytitanium and an electron donor compound, subjecting the solution to precipitation with a halogenating agent or halogenated titanium compound to precipitate a solid component, and then allowing the solid component to come into contact with a titanium compound (4) Method which comprises treating alumina or magnesia with a halogenated phosphorus compound, and then allowing the alumina or magnesia thus treated to come into contact with a halogenated magnesium compound, an electron donor compound and a halogenated titanium compound (5) Method which comprises allowing a Grignard reagent such as organic magnesium compound or a reducing agent to act on a halogenating agent, and then allowing an electron donor compound and a titanium compound to come into contact with each other in the presence of such a Grignard reagent or reducing agent (6) Method which comprises allowing an alkoxymagnesium compound to come into contact with a halogenating agent and/or titanium compound in the presence or absence of an electron donor compound (7) Method which comprises dissolving a magnesium compound with a tetraalkoxytitanium, treating the solution with a polymer silicon compound, and then treating the material with a silicon halide compound and an organic metal compound (8) Method which comprises treating a spherical magnesium compound/alcohol complex with an electron donor compound, a halogenated titanium compound, etc.

Particularly preferred among these methods is the method (8).

The solid catalyst thus prepared is treated with a titanium compound represented by the general formula TiXa·Yb (in which X represents a halogen atom such as Cl, Br and I, a is 3 or 4, Y represents an electron donor compound, and 0<b≦3) once or more times and with a halogen-containing compound once or more times, and then washed with a hydrocarbon to prepare the modified catalyst component of the present invention. TiXa·Yb is known to easily form a complex with an electron donor compound as described in R. S. P. Coutts, P. C. Wailes, *Adovan. Organometal. Chem.*, Vol. 9, page 135 (1970), New Institute of Experimental Chemistry 17: *Inorganic Complex and Chelate Complex*, 4th ed., page 35, Japan Society of Chemistry, Maruzen (1991), H. K. Kakkoen, J. Pursiainen, T. A. Pakkanen, M. Ahlgren, E. Iiskola, *J. Organomet. Chem.*, Vol. 453, page 175 (1993).

Y (electron donor compound) in TiXa·Yb may be the same as or different from the electron donor compound used in the preparation of the solid catalyst. For the preparation of TiXa·Yb, these electron donor compounds may be used singly or in combination.

As the halogen-containing compound there may be used one same as or different from that used in the preparation of the solid catalyst. These halogen-containing compounds may be used singly or in combination.

The temperature at which the solid catalyst is treated with TiXa·Yb is from −30° C. to 150° C., preferably from 0° C. to 100° C. The temperature at which the solid catalyst is treated with the halogen-containing compound is from 0° C. to 200° C., preferably from 50° C. to 150° C.

The amount of TiXa·Yb to be used is preferably from 0.001 to 500 by mol, more preferably from 0.1 to 100 by mol, based on the amount of titanium atom in the solid catalyst.

The treatment of the solid catalyst with TiXa·Yb and the halogen-containing compound may be generally effected in an inert hydrocarbon medium. Examples of the inert hydrocarbon medium employable herein include aliphatic hydrocarbon such as pentane, hexane, heptane, octane and decane, and aromatic hydrocarbon such as benzene, toluene and xylene.

Such an inert hydrocarbon solvent may be used as a washing solvent for the olefin polymerization catalyst obtained by the treatment of the solid catalyst with TiXa·Yb and the halogen-containing compound.

Preferred among modified polymerization catalysts thus prepared are those having the following powder physical properties:

(1) a surface area of from 100 to 300 m$^2$/g;

(2) a pore volume of from 0.30 to 0.45 cc/g in a pore diameter range of from 2 nm to 40 nm.;

(3) a weight-average grain diameter of from 50 to 100 μm;

(4) a percent proportion of grains having a grain diameter of not less than 123 μm of not more than 15% by weight; and (5) a percent proportion of grains having a grain diameter of not more than 87 μm of not less than 35% by weight.

The surface area is determined by BET process (as described in S. Brunauer, P. H. Emmett, E. Teller, *J. Am. Chem. Soc.*, Vol. 60, page 309 (1938)). For BET process, a commercial measuring instrument such as Sorptomatic Series 1800 (available from CARLO EBRA STRUMENTAZIONE) is used. In this process, a nitrogen gas absorption method is employed.

The term "pore volume" as used herein is meant to indicate the total volume of pores contained in a porous substance. In general, such a porous substance has an aggregate of pores having different diameters, not a single diameter. Thus, the distribution of pore diameters is determined. From the distribution of pore diameters is determined the pore volume. The pore volume of a catalyst or the like can be determined by a mercury injection method (as described in E. W. Washburn, "Proc. Natl. Acad. Sci.", Vol. 7, page 115, 1921). In this mercury injection method, mercury is injected into the pores in the catalyst. The penetration of mercury into the pores can be determined as a function of pressure. This measurement may be accomplished by means of a commercial measuring instrument such as Auto Pore 9200 Type, available from MICROMERITIS CORP.

The grain diameter can be determined by measuring the grain diameter distribution by diffraction pattern analysis. In this diffraction pattern analysis, laser beam expanded by a beam expander is directed at grains dispersed in a gas phase or liquid phase. A diffraction pattern generated by these grains is collected by a lens, and then projected onto a detector. The distribution of intensity of Fraunhofer diffraction pattern developed on the detector is then analyzed to determine the grain diameter.

This analytical method is further described in Michael Heuer, Kurt Leschonski, Results Obtained with a New Instrument for the Measurement of Particle Size Distributions from Diffraction Patterns: Part 2, (1985), pp. 7 to 13 and J. Fraunhofer, *Brehungs und Frarbzerstreuungsverm gens*verschiedener Glasarten. Gilberts Annalen der Physik, vol. 56 (1987), pp. 193 to 226. In some detail, a commercial laser diffraction type grain size distribution measuring instrument HELOS & RODOS available from JEOL Ltd. may be employed.

The modified polymerization catalyst thus prepared may be used in combination with the organic aluminum compound and stereoregularity modifier described later to prepare BPP of the present invention.

Representative examples of the organic aluminum compound include trialkylaluminum such as trimethylaluminum, triethylaluminum, tripropylaluminum, tributylaluminum, trihexylaluminum and trioctylaluminum, and aluminoxane such as methylaluminoxane, ethylaluminoxane and propylaluminoxane. These organic aluminum compounds may be used singly or in combination.

Examples of the stereoregularity modifier include silicon compounds having Si—O—C bond such as phenyl triethoxysilane, diphenyl dimethoxysilane, di-n-propyldimethoxysilane, di-i-propyldimethoxysilane, di-t-butyldimethoxysilane, dicyclohexyldimethoxysilane, dicyclopentyldimethoxysilane, cyclohexylmethyl dimethoxysilane, thexyltrimethoxysilane, t-butyltrimethoxysilane, cyclohexyltrimethoxysilane, tetramethoxysilane and tetraethoxysilane. The stereoregularity modifiers may be used singly or in combination.

The polymerization process is not specifically limited. Any known polymerization process may be used. Either a continuous process or a batchwise process may be used. The form of the polymerization reactor is not specifically limited. The foregoing BPP may be prepared by a slurry process in the presence of an inert hydrocarbon such as hexane, heptane and kerosine or a liquefied α-olefin solvent such as propylene or a gas phase polymerization process, at a polymerization temperature of from room temperature to 130° C., preferably from 50° C. to 90° C. The polymerization pressure is from 2 to 50 kg/cm$^2$.

As the reactor to be used in the polymerization step, a reactor commonly used in the art may be used. For example, using an agitation tank type reactor, fluidized bed type reactor or circulation type reactor, the polymerization may be effected in a continuous process, semi-batchwise process or batchwise process.

BPP slurry or powder thus obtained is optionally inactivated with an alcohol, water or the like or freed of residual catalyst before being dried and melt-mixed with additives.

Examples of the soft elastomer (B) in the resin composition of the second and third embodiments of the present invention include polyolefin rubber such as EPR and EPDM, and styrene elastomer such as SEPS and SEBS. Preferred among these soft elastomers are EPR, EPDM, SEPS and SEBS. These soft elastomers may be used singly or in admixture. The melt flow rate (determined in accordance with JIS K7210, under Condition 14 shown in Table 1) of the component (B) is generally from 0.1 to 30 g/10 min, preferably from 0.3 to 20 g/10 min.

The amount of the soft elastomer (B) in the resin composition of the second embodiment of the present invention is generally from 1 to 20% by weight, preferably from 5 to 12% by weight, and particularly preferably from 6 to 10% by weight. That is, the amount of the propylene block copolymer (A) in the resin composition of the second embodiment of the present invention is generally from 80 to 99% by weight, preferably from 88 to 95% by weight, and particularly preferably from 90 to 94% by weight. If the percent composition of the component (B) falls below 1% by weight, rigidity and impact resistance are ill-balanced. If the percent composition of the component (B) exceeds 20% by weight, the resulting resin composition shows a poor external appearance such as flow mark.

As the inorganic fiber (C) used in the resin composition of the third embodiment of the present invention, known various filers can be used. Examples thereof include talc, mica, glass fibers, carbon fibers, wollastonite, calcium silicate, aluminum silicate, calcium carbonate, calcium titanate, aluminum borate, magnesium sulfate, carbon black, etc. Among these, talc, mica, and calcium carbonate are preferably used.

The amount of the BPP (A) in the resin composition of the third embodiment of the present invention is generally from 50 to 98% by weight, preferably from 60 to 95% by weight, and particularly preferably from 65 to 90% by weight. If the amount of the BPP (A) falls below 50% by weight, rigidity and heat resistance tend to be inferior. If it exceeds 98% by weight, the balance between the rigidity and the impact resistance tends to be inferior.

The amount of the soft elastomer (B) in the resin composition of the third embodiment of the present invention is generally 1 to 20% by weight, preferably from 5 to 12% by weight, and particularly preferably from 6 to 10% by weight. If the amount of the component (B) falls below 1% by weight, the balance between the rigidity and the impact resistance tends to be inferior. If it exceeds 20% by weight, it can deteriorate the external appearance such as gloss and flow mark.

The amount of the component (C) in the resin composition of the third embodiment of the present invention is generally from 1 to 30% by weight, preferably from 3 to 25% by weight, and particularly preferably from 5 to 20% by weight. If the amount of the component (C) falls below 1% by weight, it exerts a reduced effect of improving rigidity and heat resistance. If the percent composition of the component (C) exceeds 30% by weight, it can deteriorate the impact resistance of the resin composition and can cause bleedout that stains mold.

BPP and resin composition of the present invention may further comprise a nucleating agent incorporated therein to have better rigidity, heat resistance and impact strength.

The term "nucleating agent" as used herein is meant to indicate a substance which becomes nuclei on which a crystal grows when added to a crystallizable resin in the field of synthetic resin. There are various such substances.

Examples of such substances include metal salt of carboxylic acid, dibenzylidenesorbitol derivative, phosphate metal salt, and inorganic filler such as talc and calcium carbonate.

Specific examples of such a nucleating agent include sodium benzoate, aluminum adipate, aluminum p-t-butylbenzoate, sodium thiophenecarboxylate, 1,3,2,4-dibenzylidenesorbitol, 1,3,2,4-di-(p-methylbenzylidene) sorbitol, 1,3-p-chlorobenzylidene-2,4-p-methylbenzylidene sorbitol, sodium bis(4-t-butylphenyl)phosphate, potassium bis(4-t-butylphenyl)phosphate, sodium 2,2'-ethylidene-bis( 4,6-di-t-butylphenyl)phosphate, and inorganic compound such as talc and calcium carbonate. These nucleating agents may be used singly or in combination.

The amount of such a nucleating agent to be added is preferably from 0.05 to 0.5% by weight based on the weight of BPP or resin composition because the effect of the present invention can be remarkable.

The amount of the nucleating agent to be added is more preferably from 0.08 to 0.4% by weight, and particularly preferably from 0.1 to 0.35% by weight. The inorganic compound such as talc exerts a smaller nucleating effect than the exemplified nucleating agents and thus is preferably added in an amount of from 5 to 30% by weight, more preferably from 7 to 28% by weight, and particularly preferably from 9 to 25% by weight.

BPP or resin composition of the present invention may comprise other additives commonly used in thermoplastic resin (e.g., oxygen inhibitor, weathering stability, antistatic agent, lubricant, blocking inhibitor, anti-fogging agent, dye, pigment, oil, wax, filler) incorporated therein in a proper amount so far as the objects of the present invention can be impaired.

Examples of these additives include oxidation inhibitor such as 2,5-di-t-butylhydroquinone, 2,6-di-t-butyl-p-cresol, 4,4'-thiobis-(6-t-butylphenol), 2,2-methylene-bis(4-methyl-6-t-butylphenol), octadecyl- 3-(3',5'-di-t-butyl-1'-hydroxyphenyl)propionate and 4,4'-thiobis-(6-butylphenol), ultraviolet absorbent such as ethyl-2-cyano-3,3-diphenyl acrylate, 2-(2'-hydroxy-5-methylphenyl)benzotriazole and 2-hydroxy-4-octoxybenzophenone, plasticizer such as dimethyl phthalate, diethyl phthalate, wax, liquid paraffin and ester phosphate, antistatic agent such as pentaerythritol monostearate, sorbitan monopalmitate, sulfated oleic acid, polyethylene oxide and carbon wax, lubricant such as ethylene bisstearoamide and butyl stearate, colorant such as carbon black, phthalocyanine, quinacridone, indoline, azo pigment, titanium oxide and red iron oxide, and filler such as glass fiber, asbestos, mica, ballastonite, calcium silicate, aluminum silicate and calcium carbonate. Further, many other high molecular compounds may be blended so far as the effect of the present invention cannot be impaired.

As the method for the preparation of resin composition of the present invention, a method can be employed, which comprises melt-kneading BPP with the nucleating agent and other additives. In some detail, a known mixing method using a ribbon blender, Henschel mixer or the like may be employed to mix the various components which are then melt-kneaded by means of a kneader, mixing roll, Banbury mixer, extruder or the like. The melt-kneading temperature is preferably from 170° C. to 280° C., more preferably from 190° C. to 260° C., and particularly preferably from 200° C. to 250° C. Alternatively, the various components may be directly supplied into a forming machine by which they are formed.

The melt flow rate (MFR, determined in accordance with JIS-K7210 under a load of 2.16 kg at 230° C.) of the foregoing resin composition is not specifically limited but may be determined by the forming method. It preferably ranges from 0.1 to 250 g/min depending on the extrusion method.

The resin composition of the present invention can be molded into injection-molded product, film, sheet, tube, bottle or the like by a known melt forming method or compression molding method. These formed products may be used singly or in the form of laminate with other materials.

The lamination of such a product may be accomplished by a so-called dry laminate forming method or sandwich lamination method which comprises laminating a single-layer product of the resin composition of the present invention with other thermoplastic resin layers using a dry laminate adhesive such as polyurethane, polyester and polyacryl. Alternatively, co-extrusion lamination method, co-extrusion method (e.g., feed block method, multi-manifold method), co-injection method or co-extrusion pipe forming method may be employed.

The multi-layer laminate thus obtained may be re-heated and oriented by means of a vacuum molding machine, pressure molding machine, stretching blow molding machine or the like. Alternatively, the foregoing multi-layer laminate or single-layer product of resin composition may be heat-oriented by means of a monoaxial or biaxial stretching machine.

The present invention will be further described in the following examples, but the present invention should not be construed as being limited thereto.

The method and apparatus for the measurement of the various physical properties of the present invention will given below.

13

(1) Notched Izod impact strength

The measurement of notched Izod impact strength was effected in accordance with JIS K7110. As the measuring instrument there was used a U-F impact tester available from Ueshima Seisakusho K.K.

(2) Flexural modulus

The measurement of flexural modulus was effected in accordance with JIS K7203.

(3) Ethylene content

The measurement of ethylene content was effected in accordance with $^{13}$C-NMR process reported by C. J. Carman, *Macromolecules*, vol. 10, 537, 1977.

(4) MFR

The measurement of MFR was effected under Condition 14 set forth in Table 1 of JIS K7210. As the measuring instrument there was used a melt indexer available from Takara Co., Ltd.

(5) Surface gloss

The measurement of the surface gloss of the film was effected by means of a glossmeter available from Nihon Denshoku Kogyo K.K. in accordance with JIS K7205.

(6) Falling weight impact strength

The measurement of falling weight impact strength was effected in accordance with ASTM D3029-78. In some detail, a 1 kg weight of steel sphere having a diameter of ½ in. was allowed to fall onto the specimen from a height of 75 cm at temperatures ranging from 20° C. to lower temperatures obtained by cooling with dry ice methanol. The degree of destruction at the various temperatures was measured. The highest temperature at which 50% of the specimens are destroyed was determined.

(7) Soluble content on xylene extraction at 25° C. ($X_{IS}$)

BPP was dissolved in orthoxylene at 135° C., and then cooled to 25° C. to cause a polymer to be precipitated. The soluble content was then dried and determined as $X_{IS}$ (% by weight).

(8) Haze (transparency)

The measurement of total haze was effected in accordance with JIS K7105.

(9) Crystallization temperature and ratio of area of secondary peak to area of main peak (SMA)

Apparatus: Type DSC7, available from PERKIN-ELMER

Specimen weight: approx. 3 to 5 mg

Measuring method:

The specimen was heated to a temperature of 230° C. where it was then kept for 5 minutes. The specimen was then cooled to a temperature of –30° C. at a rate of 20° C./min. to obtain the crystallization temperature curve. From the crystallization temperature curve were then obtained the main peak temperature, secondary peak temperature and ratio of the area of the secondary peaks to that of the main peak (SMA).

(10) Analysis by two-site model

The soluble content on xylene extraction at 25° C. obtained in item (7) above was dissolved in a mixture of 1,2,4-trichlorobenzene and deuterated benzene at 130° C. in such a manner that the polymer concentration reached 10% by weight. The specimen was then measured for $^{13}$C-NMR spectrum by means of the following apparatus under the following conditions. The various signals were each assigned in accordance with A. Zambelli et al, *Macromolecules*, vol. 13, 267, 1980.

Measuring instrument: JNM-GSX400 ($^{13}$C nuclear resonance frequency: 100 MHz), available from Jeol Ltd.

Pulse width: 8.0 μsec.

Pulse repetition time: 5.0 sec.

Number of integration: 20,000 times

14

Solvent: 75/25 (% by volume) mixture of 1,2,4-trichlorobenzene and deuterated benzene Internal standard: Hexamethyldisiloxane Specimen concentration: 300 mg/3.0 ml solvent Measurement temperature: 120° C.

FP, $P_p$, $P_{fl}$ and CSD were then determined using two-site model.

(11) Grain size distribution of polymerization catalyst

Measuring instrument: HELOS & RODOS, available from Jeol Ltd.

Dispersing liquid: Hexane

Focal length: 100 mm (12) Thermal deformation temperature

The measurement of thermal deformation temperature was effected in accordance with JIS K7207B by means of a HDTαVSP tester available from Toyo Seiki Seisakusho K.K. under a load of 4.6 kg.

(13) Mold shrinkage

A plate specimen (size: 11×15 cm; thickness: 2 mm) was allowed to stand in a constant temperature chamber (23° C., 50%RH) for 2 days, and then measured for percent shrinkage in MD (mechanical direction) and TD (transverse direction).

(14) External appearance

The degree of flow mark was visually evaluated by the following 3-step criterion:

G: No flow marks

F: Some flow marks

P: Remarkable flow marks (15) Decalin (decahydronaphthalene) intrinsic viscosity at 135° C.

100 mg of the soluble content on xylene extraction at 25° C. obtained in item (7) above was dissolved in 30 ml of decalin (decahydronaphthalene). The specimen solution was then measured for viscosity by means of an Ubbelohde capillary viscometer.

(16) Film impact strength

The measurement of film impact strength was effected at a temperature of 23° C. and –50° C. by means of a pendulum type film impact tester (1.2 inch hemisphere) available from Toyo Seiki Seisakusho K.K.

(17) Tensile modulus

The measurement of tensile modulus was effected at a pulling rate of 5 mm/min. in accordance with JIS K7127.

(18) Heat sealing characteristics

Strips having a width of 15 mm were heat-sealed under a pressure of 2 kg/cm² for 1 second by means of a heat sealer available from Tester Sangyo K.K. The specimen was then subjected to T type peeling at a peeling rate of 300 mm/min. by means of a tensile tester available from Orientech Co., Ltd.

The heat sealing was effected at intervals of 5° C. The heat sealing characteristics were represented by the lowest temperature at which the peel strength was not less than 500 g/15 mm.

Example of preparation of polymerization catalyst (1) Preparation of solid catalyst 56.8 g of magnesium chloride anhydride was thoroughly dissolved in a mixture of 100 g of ethanol anhydride, 500 ml of a vaseline oil CP15N available from Idemitsu Kosan K.K. and 500 ml of a silicone oil KF96 available from Shin-etsu Silicone Co., Ltd. at a temperature of 120° C. in an atmosphere of nitrogen. The mixture was then stirred at a temperature of 120° C. at 5,000 r.p.m. by means of a TK homomixer available from Tokushu Kika Kogyo K.K. for 2 minutes. The mixture was then transferred to 2 l of heptane anhydride while being stirred in such an arrangement that the temperature thereof did not exceed 0° C. The white solid thus obtained was thoroughly washed with heptane anhydride, dried in vacuo at room temperature, and then partially deethanolized in a stream of nitrogen.

30 g of MgCl$_2$.1.2C$_2$H$_5$OH in the form of spherical solid powder was then suspended in 200 ml of heptane anhydride. 500 ml of titanium tetrachloride was then added dropwise to the suspension with stirring at a temperature of 0° C. in 1 hour. The mixture was then heated to a temperature of 40° C. where 4.96 g of diisobutyl phthalate was then added thereto. The mixture was then heated to a temperature of 100° C. in about 1 hour. The reaction mixture was then allowed to undergo reaction at the same temperature for 2 hours. The reaction mixture was then hot-filtered to recover a solid content. Thereafter, to the reaction product was added 500 ml of titanium tetrachloride. The reaction mixture was then stirred. The reaction mixture was then allowed to undergo reaction at a temperature of 120° C. for 1 hour. After the completion of the reaction, the reaction product was again hot-filtered to recover a solid content. The solid content was washed with 7 portions of 1.0 l of 60° C. hexane and then with 3 portions of 1.0 l room temperature hexane. The titanium content in the solid catalyst component thus obtained was then measured. The result was 2.36% by weight.

(2) Preparation of TiCl$_4$[C$_6$H$_4$(COOiC$_4$H$_9$)$_2$]

To a solution of 19 g of titanium tetrachloride in 1.0 l of hexane was added dropwise 27.8 g of diisobutyl phthalate C$_6$H$_4$(COOiC$_4$H$_9$) while the temperature thereof was being kept to 0° C. in about 30 minutes. After the completion of the dropwise addition, the reaction mixture was heated to a temperature of 40° C. where it was then allowed to undergo reaction for 30 minutes. After the completion of the reaction, a solid content was recovered, and then washed with 5 portions of 500 ml of hexane to obtain the desired matter.

(3) Preparation of modified polymerization catalyst 20 g of the solid catalyst obtained in the foregoing process (1) was suspended in 300 ml of toluene, washed with TiCl$_4$[C$_6$H$_4$(COOiC$_4$H$_9$)$_2$] obtained in the foregoing process (2) with stirring for 1 hour, and then hot-filtered to recover a solid content. The reaction product thus obtained was washed with 3 portions of 300 ml 90° C. toluene and then with 3 portions of 500 ml room temperature hexane. The titanium content in the solid catalyst component thus obtained was 1.78% by weight. The modified polymerization catalyst thus obtained was measured for surface area and pore volume. The following results were obtained.
Surface area: 165 m$^2$/g
Pore volume: 0.31 cc/g in the pore diameter range of from 2 to 40 nm
Weight-average grain diameter: 86.1 μm
Proportion of grains having a diameter of not less than 123 μm: 5.0 wt %
Proportion of grains having a diameter of not more than 87 μm: 51.5 wt %

(4) Prepolymerization

Into a 3-l inner volume autoclave were charged 500 ml of n-heptane, 6.0 g of triethylaluminum, 3.9 g of dicyclopentyldimethoxysilane and 10 g of the modified polymerization catalyst obtained in the foregoing process (3) in an atmosphere of nitrogen. The reaction mixture was stirred at a temperature of from 0° C. to 50° C. for 5 minutes. A propylene was then supplied into the autoclave in such an amount that 10 g of propylene was polymerized per g of modified polymerization catalyst. The reaction system was allowed to undergo prepolymerization at a temperature of from 0° C. to 5° C. for 1 hour. The solid prepolymerization catalyst thus obtained was then washed with 3 portions of 500 ml of n-heptane to obtain the final solid prepolymerization catalyst.

EXAMPLE 1

(a) 1st stage: preparation of homopolypropylene

Into a 60-l inner volume autoclave equipped with an agitator were charged 2.0 g of the foregoing solid prepolymerization catalyst, 11.4 g of triethylaluminum and 6.84 go of dicyclopentyldimethoxysilane in an atmosphere of nitrogen. Subsequently, into the autoclave were charged a propylene in an amount of 18 kg and hydrogen in an amount of 14,000 mol ppm based on the propylene. The reaction mixture was then heated to a temperature of 70° C. where it was then allowed to undergo polymerization for 1 hour. After 1 hour, unreacted propylene was removed to terminate the polymerization.

(b) 2nd stage: preparation of propylene-ethylene copolymer

After the termination of the 1st stage polymerization, the liquid propylene was removed. The reaction system was then allowed to undergo copolymerization at a temperature of 75° C. while a 40/60 (by mol) mixture of ethylene and propylene and hydrogen were being supplied thereinto at a rate of 2.2 Nm$^3$/hr. and 20 NL/hr., respectively, for 40 minutes. After 40 minutes, the unreacted gas was removed to terminate the polymerization. As a result, 7.3 kg of a propylene block copolymer was obtained. The various physical properties of BPP thus obtained and the results of analysis by two-site model are set forth in Table 2.

BPP thus obtained was then mixed with 0.05% by weight of di-t-butyl-p-cresol, 0.10% by weight of pentaerythrytyltetrakis[3-(3,5-di-t-butyl-4-hydroxyphenyl) propionate] and 0.10% by weight of calcium stearate. The mixture was then pelletized by means of a Type SMV20 supermixer available from Kawata Seisakusho K.K.

The pelletized material was then subjected to injection molding by means of an injection molding machine (IS-170FII, available from Toshiba Machine Co., Ltd. (calculated rate: 250 cm$^3$) at a forming temperature of 220° C. and a mold cooling temperature of 50° C. to prepare an Izod impact specimen, a flexural modulus specimen, a loaded deflection temperature specimen and a falling weight impact strength specimen (2 mm thick×15 cm long×11 cm wide plate). These specimens were allowed to stand in a constant temperature chamber having a humidity of 50% and a temperature of 23° C. for 2 days and nights, and then measured for these physical properties.

The 2-mm thick specimen was also subjected to measurement of surface gloss and haze. The results are set forth in Table 3.

EXAMPLES 2 TO 7

The procedure of Example 1 was followed to effect polymerization except that the charged amount of hydrogen during polymerization, the second stage polymerization time and the amount of ethylene used were changed. As a result, a propylene block copolymer set forth in Table 2 was obtained. Both of block polypropylenes obtained from Examples 3 and 4 were referred to as BPP3 and BPP4, respectively.

The propylene block copolymer thus obtained was then measured for the various physical properties in the same manner as in Example 1. The results are set forth in Table 3.

EXAMPLE 8

The procedure of Example 1 was followed to effect polymerization except that propylene and ethylene were supplied at the 1st stage. As a result, a polypropylene block having an ethylene content of 2.4% by weight at the 1st stage was obtained. For the measurement of the ethylene content, the material was sampled upon the termination of the 1st stage polymerization.

The results of the various physical properties are set forth in Tables 2 and 3.

COMPARATIVE EXAMPLE 1

The procedure of Example 1 was followed to effect polymerization except that the solid catalyst prepared in the foregoing process (1) was used and the charged amount of hydrogen was changed to 9,500 mol ppm. BPP thus obtained was referred to as BPP6. The results are set forth in Tables 2 and 3.

The powder physical properties of the catalyst used were as follows:
Surface area: 206 m²/g
Pore volume: 0.36 cc/g in the pore diameter range of from 2 to 40 nm
Weight-average grain diameter: 93.5 μm
Proportion of grains having a diameter of not less than 123 μm: 16.5 wt %
Proportion of grains having a diameter of not more than 87 μm: 34.1 wt %

COMPARATIVE EXAMPLE 2

The procedure of Example 1 was followed to effect polymerization except that 6.0 g of AA type titanium trichloride available from Tosoh Azo Co., Ltd. and 23.5 g of diethylaluminum chloride were charged into the 60-l inner volume autoclave equipped with an agitator in an atmosphere of nitrogen, followed by the addition of a propylene in an amount of 18 kg and hydrogen in an amount of 8,000 mol ppm based on the amount of propylene and heating to a temperature of 70° C. BPP thus obtained was referred to as BPP7. The results are set forth in Tables 2 and 3.

Surface area: 41 m²/g
Pore volume: 0.25 cc/g in the pore diameter range of from 2 to 40 nm
Weight-average grain diameter: 5.6 μm
Proportion of grains having a diameter of not less than 123 μm: 0.5 wt %
Proportion of grains having a diameter of not more than 87 μm: 93.2 wt %

TABLE 2

| BPP | MFR (g/10 min) | Ethylene content (wt %) | Proportion of copolymer rubber block (wt %) | Secondary peak temperature (°C.) | SMA (%) | 25° C. Xylene soluble content* (wt %) | FP (mol %) | $P_p$ (mol %) | $P_n$ | CSD | 135° C. decalin intrinsic viscosity $[\eta]^{**}$ (dl/g) |
|---|---|---|---|---|---|---|---|---|---|---|---|
| Example 1 | 2.7 | 15.8 | 26.5 | 97.5 | 3.8 | 19.3 | 40.4 | 69.1 | 0.43 | 1.8 | 2.0 |
| Example 2 | 1.1 | 12.9 | 19.7 | 95.9 | 2.5 | 15.9 | 34.7 | 68.4 | 0.34 | 1.6 | 2.2 |
| Example 3 | 15.3 | 15.4 | 32.5 | 91.7 | 4.5 | 25.8 | 47.7 | 63.3 | 0.52 | 1.5 | 2.5 |
| Example 4 | 8.7 | 25.4 | 45.5 | 96.5 | 6.3 | 31.3 | 36.6 | 54.5 | 0.36 | 1.4 | 2.6 |
| Example 5 | 10.7 | 20.4 | 43.1 | 93.1 | 3.9 | 31.8 | 47.2 | 62.5 | 0.51 | 1.5 | 2.9 |
| Example 6 | 12.6 | 14.6 | 30.4 | 96.2 | 4.2 | 18.7 | 48.2 | 71.4 | 0.46 | 1.9 | 2.3 |
| Example 7 | 13.4 | 9.8 | 19.3 | 95.8 | 2.9 | 15.6 | 43.5 | 69.5 | 0.44 | 1.8 | 2.2 |
| Example 8 | 8.4 | 13.4 | 24.4 | 92.6 | 3.7 | 24.1 | 45.1 | 60.2 | 0.42 | 1.7 | 2.1 |
| Comparative Example 1 | 18.1 | 9.6 | 18.8 | 95.2 | 0.4 | 17.6 | 58.8 | 75.0 | 0.71 | 2.8 | 4.3 |
| Comparative Example 2 | 12.3 | 9.4 | 18.5 | none | — | 18.2 | 50.3 | 62.1 | 0.75 | 1.8 | 4.5 |

Note:
*Soluble amount on xylene extraction at 25° C.
**135° C. decalin (decahydronaphthalene) intrinsic viscosity

TABLE 3

| BPP | Flexural modulus (kg/cm³) | Notched Izod impact strength 23° C. (kg-cm/cm) | Notched Izod impact strength −20° C. (kg-cm/cm) | Falling weight impact test (°C.) | Whitening resistance* (%) | Total haze (%) | Gloss (%) |
|---|---|---|---|---|---|---|---|
| Example 1 | 10,000 | 64.6 | 11.2 | −45 | 10 | 76.4 | 87.6 |
| Example 2 | 10,300 | not destroyed | 9.8 | −48 | 8 | 71.3 | 86.9 |
| Example 3 | 9,200 | 60.9 | 8.9 | −55 | 5 | 77.2 | 88.5 |
| Example 4 | 7,600 | not destroyed | 13.6 | ≦−60 | 0 | 77.6 | 89.4 |
| Example 5 | 8,300 | not destroyed | 14.8 | −55 | 5 | 78.8 | 88.2 |
| Example 6 | 9,900 | 58.6 | 8.2 | −46 | 15 | 70.8 | 88.9 |
| Example 7 | 13,900 | 11.5 | 5.6 | −45 | 12 | 72.4 | 87.2 |
| Example 8 | 7,400 | not destroyed | 108 | −55 | 5 | 75.5 | 88.2 |

TABLE 3-continued

|  | Flexural modulus (kg/cm³) | Notched Izod impact strength | | Falling weight impact test (°C.) | Whitening resistance* (%) | Total haze (%) | Gloss (%) |
| --- | --- | --- | --- | --- | --- | --- | --- |
| BPP |  | 23° C. (kg-cm/cm) | −20° C. (kg-cm/cm) |  |  |  |  |
| Comparative Example 1 | 13,400 | 8.9 | 4.4 | −40 | 55 | 92.5 | 61.5 |
| Comparative Example 2 | 12,300 | 8.4 | 3.8 | −39 | 62 | 93.2 | 60.8 |

Note:
*Proportion of whitened area

BPP1 to BPP7 used in the preparation of the resin composition of the present invention were obtained in the following manner.

BPP1 to BPP5

Block copolymers (hereinafter referred to as BPP1 to BPP5) were obtained in the same manner as in Example 1 except that the charged amount of hydrogen upon polymerization in the first stage polymerization, the second stage polymerization time, and the amount of ethylene were changed. The physical properties of these block copolymers are set forth in Table 4.

BPP6 and BPP7

BPP 6 and 7 were prepared in the same manner as in Comparative Examples 1 and 2, respectively. The physical properties of these block copolymers are set forth in Table 4.

a Type SMV20 supermixer available from Kawata Seisakusho K.K., and then pelletized by means of a twin-screw extruder (KTX37, available from Kobe Steel, Ltd.).

The pelletized material was then subjected to injection molding by means of an injection molding machine (IS-170FII, available from Toshiba Machine Co., Ltd. (calculated rate: 250 cm³) at a forming temperature of 220° C. and a mold cooling temperature of 50° C. to prepare an Izod impact specimen, a flexural modulus specimen, a loaded deflection temperature specimen, and shrinkage factor and external appearance specimen (size: 15 cm×11 cm; thickness: 2 mm). These specimens were allowed to stand in a constant temperature chamber having a humidity of 50% and a temperature of 23° C. for 2 days and nights, and then measured for these physical properties. The 2-mm thick specimen was also subjected to measurement of surface gloss. The results are set forth in Table 5.

TABLE 4

| BPP | MFR (g/10 min) | Ethylene content (wt %) | Proportion of copolymer rubber block (wt %) | Measurement of DSC Secondary peak temperature (°C.) | SMA (%) | 25° C. Xylene soluble content* (wt %) | PP (mol %) | $P_p$ (mol %) | $P_{f1}$ | CSD | 135° C. decalin intrinsic viscosity [η]** (dl/g) |
| --- | --- | --- | --- | --- | --- | --- | --- | --- | --- | --- | --- |
| BPP1 | 14.6 | 18.1 | 30.8 | 95.9 | 3.5 | 23.0 | 48.0 | 70.8 | 0.29 | 1.5 | 3.4 |
| BPP2 | 18.2 | 16.4 | 28.7 | 98.1 | 3.1 | 22.9 | 49.3 | 68.7 | 0.35 | 1.6 | 2.4 |
| BPP3 | 15.3 | 15.4 | 32.5 | 91.7 | 4.5 | 25.8 | 47.7 | 63.3 | 0.52 | 1.5 | 2.5 |
| BPP4 | 8.7 | 25.4 | 45.5 | 96.5 | 6.3 | 31.3 | 36.6 | 54.5 | 0.36 | 1.4 | 2.6 |
| BPP5 | 10.9 | 28.1 | 48.5 | 97.4 | 7.3 | 29.8 | 56.9 | 62.5 | 0.51 | 1.5 | 5.2 |
| BPP6 | 18.1 | 9.6 | 18.8 | 95.2 | 0.4 | 17.6 | 58.8 | 75.0 | 0.71 | 2.8 | 4.3 |
| BPP7 | 12.3 | 9.4 | 18.5 | none | — | 18.2 | 50.3 | 62.1 | 0.75 | 1.8 | 4.5 |

Note:
*Soluble amount on xylene extraction at 25° C.
**135° C. decalin (decahydronaphthalene) intrinsic viscosity As soft elastomers (B), EPR (hereinafter referred to as "EPR1") having a Mooney viscosity ($ML_{1+4}$, 100° C.) of 80 and an ethylene content of 73% by weight, and EPR (hereinafter referred to as "EPR2") having a Mooney viscosity ($ML_{1+4}$, 125° C.) of 19 and an ethylene content of 51% by weight were used.

EXAMPLES 9 TO 14 AND COMPARATIVE EXAMPLES 3 TO 4

BPP and EPR of the kind set forth in Table 3 in an amount set forth in Table 3, di-t-butyl-p-cresol in an amount of 0.05% by weight, pentaerythrytyltetrakis[]3-(3,5-di-t-butyl-4-hydroxyphenylpropionate in an amount of 0.10% by weight and calcium stearate in an amount of 0.10% by weight were mixed. The mixture was kneaded by means of

EXAMPLE 15 AND COMPARATIVE EXAMPLE 5

The compositions obtained in Example 1 and Comparative Example 2 were each subjected to processing by a T-die forming machine (diameter: 40 mm) available from Yoshii Tekko K.K. at a die temperature of 230° C. and a cooling roll temperature of 30° C. to prepare a 70-μm thick film. These films were then measured for film impact strength, heat sealing properties and tensile modulus. The results are set forth in Table 6.

TABLE 5

| | BPP (A) Kind/ Amount (wt %) | EPR (B) Kind/ Amount (wt %) | Flexural modulus (kg/cm²) | Notched Izod impact strength −30° C./−40° C. (Kg-cm/cm) | Thermal deformation temperature (°C.) | Surface gloss (%) | Mold shrinkage MD/TD (1/1000%) | External appearance |
|---|---|---|---|---|---|---|---|---|
| Example 9 | BPP1/90 | EPR2/10 | 10,400 | 7.4/6.0 | 89 | 87 | 11.5/11.6 | G |
| Example 10 | BPP2/90 | EPR2/10 | 10,100 | 6.3/5.5 | 91 | 91 | 10.6/10.8 | G |
| Example 11 | BPP3/80 | EPR2/20 | 9,100 | 51.8/8.3 | 85 | 88 | 11.3/11.8 | G |
| Example 12 | BPP3/85 | EPR1/15 | 10,300 | 5.6/5.1 | 94 | 87 | 12.6/12.8 | G |
| Example 13 | BPP4/95 | EPR1/5 | 10,200 | 5.5/4.8 | 95 | 85 | 12.8/12.9 | G |
| Example 14 | BPP5/95 | EPR1/5 | 9,700 | 5.9/5.7 | 92 | 88 | 12.8/12.7 | F |
| Comparative Example 3 | BPP6/80 | EPR1/20 | 8,000 | 3.8/3.1 | 79 | 73 | 14.1/14.3 | F |
| Comparative Example 4 | BPP7/80 | EPR1/20 | 7,600 | 3.9/3.2 | 76 | 71 | 14.8/14.6 | F |

BPP1 to BPP5, BPP6 and BPP7 (comparative), EPR1 and EPR2, and talc (Enstalc, available from Hayashi Kasei K.K.), potassium titanate (Tismo, available from Otsuka Kagaku K.K.) and mica (AB32, available from Yamaguchi Unmo K.K.) as inorganic fillers (C) were used to prepare a resin composition of the present invention.

EXAMPLES 16 TO 23 AND COMPARATIVE EXAMPLES 6 AND 7

BPP, EPR and inorganic fillers of the kind set forth in Table 7 in an amount set forth in Table 7, di-t-butyl-p-cresol in an amount of 0.05% by weight, pentaerythrytyltetrakis [b]3-(3,5-di-t-butyl-4-hydroxyphenylpropionate in an amount of 0.10% by weight and calcium stearate in an amount of 0.10% by weight were mixed. The mixture was then subjected to formation and measurement in the same manner as in Example 9. The results are set forth in Table 7.

TABLE 7

| | BPP (A) Kind/ Amount (wt %) | EPR (B) Kind/ Amount (st %) | Amount of talc (wt %) | Flexural modulus (kg/cm²) | Notched Izod impact strength −30° C./−40° C. (kg-cm/cm) | Thermal deformation temperature (°C.) | Surface gloss (%) | Mold shrinkage MD/TD (1/1000%) | External appearance |
|---|---|---|---|---|---|---|---|---|---|
| Example 16 | BPP1/78 | EPR2/15 | 7 | 13,300 | 7.6/5.8 | 122 | 79 | 5.8/10.4 | G |
| Example 17 | BPP2/78 | EPR2/15 | 7 | 12,900 | 6.1/5.4 | 114 | 82 | 5.4/9.2 | G |
| Example 18 | BPP3/78 | EPR2/15 | 7 | 11,300 | 51.5/8.6 | 101 | 80 | 5.5/10.2 | G |
| Example 19 | BPP3/85 | EPR1/8 | 7 | 13,100 | 5.9/4.9 | 118 | 78 | 6.7/11.4 | G |
| Example 20 | BPP4/88 | EPR1/5 | 7 | 12,700 | 8.4/6.8 | 117 | 76 | 6.9/11.5 | G |
| Example 21 | BPP5/91 | EPR1/2 | 7 | 12,600 | 6.1/5.9 | 116 | 77 | 8.1/11.1 | F |
| Example 22 | BPP1/78 | EPR2/15 | 7 mica | 14,900 | 5.8/4.5 | 116 | 69 | 5.2/9.4 | F |
| Example 23 | BPP2/78 | EPR2/15 | 7 potassium titanate | 15,400 | 5.5/4.2 | 118 | 68 | 5.1/9.2 | F |
| Comparative Example 6 | BPP6/73 | EPR1/20 | 7 | 10,900 | 4.0/3.2 | 106 | 73 | 8.7/12.3 | F |
| Comparative Example 7 | BPP7/68 | EPR1/25 | 7 | 10,100 | 4.2/3.2 | 102 | 71 | 9.8/13.5 | P |

BPP and resin composition of the present invention exhibit well-balanced rigidity and impact strength as well as an excellent external appearance such as high gloss and little flow mark and thus can find wide application to many fields such as industrial material, household appliance parts, automobile parts and wrapping material.

While the invention has been described in detail and with reference to specific embodiments thereof, it will be apparent to one skilled in the art that various changes and modifications can be made therein without departing from the spirit and scope thereof.

What is claimed is:

1. A propylene block copolymer comprising (a) from 35 to 95% by weight of a polypropylene block and (b) from 5 to 65% by weight of a block of a copolymer of a propylene and other α-olefins, said propylene block copolymer having:

(i) in a crystallization temperature curve determined by a differential scanning calorimeter, besides a main peak, secondary peaks in a temperature range of from 90 to 100° C., and a proportion of the area of said secondary peaks to that of a main peak of from 1.5 to 10%; and (ii) a relationship between an amount of a soluble content on xylene extraction at 25° C. and a proportion of the area of said secondary peaks to that of said main peak represented by equation (I):

$$0.1X_{IS} - 1 \leq SMA \tag{I}$$

wherein $X_{IS}$ represents an amount of a soluble content on xylene extraction at 25° C. in terms of percent by weight; and SMA represents a proportion of the area of said secondary peaks to that of said main peak in terms of percent.

2. A propylene block copolymer as claimed in claim 1, wherein said soluble content on xylene extraction at 25° C. has:
   (iii) an average propylene content (FP) according to the two-site model of from 30 to 70% by mole;
   (iv) a propylene content ($P_p$) of a copolymer ($P_H$) formed at an active site, at which propylene is predominantly polymerized in the two-site model, of from 50 to 80% by mole;
   (v) a proportion of said copolymer ($P_H$) in said soluble content on xylene extraction of from 0.20 to 0.60; and
   (vi) a block property (CSD) of from 1.0 to 2.5.

3. A process for the preparation of a propylene block copolymer comprising
   (a) from 35 to 95% by weight of a polypropylene block and
   (b) from 5 to 65% by weight of a block of a copolymer of a propylene and other α-olefins,
   said propylene block copolymer having:
   (i) in a crystallization temperature curve determined by a differential scanning calorimeter, besides a main peak, secondary peaks in a temperature range of from 90° to 100° C., and a proportion of the area of said secondary peaks to that of a main peak of from 1.5 to 10%; and
   (ii) a relationship between an amount of a soluble content on xylene extraction at 25° C. and a proportion of the area of said secondary peaks to that of said main peak represented by equation (I):

$$0.1X_{IS} - 1 \leq SMA \tag{I}$$

wherein $X_{IS}$ represents an amount of a soluble content on xylene extraction at 25° C. in terms of percent by weight; and SMA represents a proportion of the area of said secondary peaks to that of said main peak in terms of percent,
   said process comprising the steps of:
   treating a solid catalyst comprising a magnesium compound, a titanium compound, a halogen-containing compound, and an electron-donating compound, with a titanium compound represented by formula TiXa·Yb, wherein X represents Cl, Br, or I; Y represents an electron-donating compound; a represents an integer of 3 or 4; and b represents an integer of 3 or less;
   washing said solid catalyst with a hydrocarbon to produce a modified polymerization catalyst; and
   conducting polymerization in the presence of said modified polymerization catalyst to produce said propylene block copolymer,
   said modified polymerization catalyst having:
   (1) a surface area of from 100 to 300 m²/g;
   (2) a pore volume of from 0.30 to 0.45 cc/g in a pore diameter range of from 2 nm to 40 nm;
   (3) a weight-average grain diameter of from 50 to 100 μm;
   (4) a percent proportion of grains having a grain diameter of not less than 123 μm of not more than 15% by weight; and
   (5) a percent proportion of grains having a grain diameter of not more than 87 μm of not less than 35% by weight.

4. A propylene resin composition comprising
   (A) from 80 to 99% by weight of a propylene block copolymer comprising (a) a polypropylene block and (b) a block of a copolymer of a propylene and other α-olefins, and
   (B) from 1 to 20% by weight of a soft elastomer,
   said propylene block copolymer (A) having:
   (i) in a crystallization temperature curve determined by a differential scanning calorimeter, besides a main peak, secondary peaks in a temperature range of from 90° to 100° C., and a proportion of the area of said secondary peaks to that of a main peak of from 1.5 to 10%; and
   (ii) a relationship between an amount of a soluble content on xylene extraction at 25° C. and a proportion of the area of said secondary peaks to that of said main peak represented by equation (I):

$$0.1X_{IS} - 1 \leq SMA \tag{I}$$

wherein $X_{IS}$ represents an amount of a soluble content on xylene extraction at 25° C. in terms of percent by weight; and SMA represents a proportion of the area of said secondary peaks to that of said main peak in terms of percent.

5. A polypropylene resin composition as claimed in claim 4, wherein said soluble content on xylene extraction at 25° C. of said propylene block copolymer (A) has:
   (iii) an average propylene content (FP) according to the two-site model of from 30 to 70% by mole;
   (iv) a propylene content (P?) of a copolymer ($P_H$) formed at an active site, at which propylene is predominantly polymerized in the two-site model, of from 50 to 80% by mole;
   (v) a proportion of said copolymer ($P_H$) in said soluble content on xylene extraction of from 0.20 to 0.60; and
   (vi) a block property (CSD) of from 1.0 to 2.5.

6. A polypropylene resin composition as claimed in claim 4, wherein said propylene block copolymer (A) is produced by a process comprising the steps of:
   treating a solid catalyst comprising a magnesium compound, a titanium compound, a halogen-containing compound, and an electron-donating compound, with a titanium compound represented by formula TiXa·Yb, wherein X represents Cl, Br, or I; Y represents an electron-donating compound; a represents an integer of 3 or 4; and b represents an integer of 3 or less;
   washing said solid catalyst with a hydrocarbon to produce a modified polymerization catalyst; and
   conducting polymerization in the presence of said modified polymerization catalyst to produce said propylene block copolymer,
   said modified polymerization catalyst having:
   (1) a surface area of from 100 to 300 m²/g;
   (2) a pore volume of from 0.30 to 0.45 cc/g in a pore diameter range of from 2 nm to 40 nm;
   (3) a weight-average grain diameter of from 50 to 100 μm;
   (4) a percent proportion of grains having a grain diameter of not less than 123 μm of not more than 15% by weight; and
   (5) a percent proportion of grains having a grain diameter of not more than 87 μm of not less than 35% by weight.

7. A propylene resin composition comprising
   (A) from 50 to 98% by weight of a propylene block copolymer comprising (a) a polypropylene block and (b) a block of a copolymer of a propylene and other α-olefins,
   (B) from 1 to 20% by weight of a soft elastomer, and
   (C) from 1 to 30% by weight of an inorganic filler, said propylene block copolymer (A) having:
- (i) in a crystallization temperature curve determined by a differential scanning calorimeter, besides a main peak, secondary peaks in a temperature range of from 90° to 100° C., and a proportion of the area of said secondary peaks to that of a main peak of from 1.5 to 10%; and
- (ii) a relationship between an amount of a soluble content on xylene extraction at 25° C. and a proportion of the area of said secondary peaks to that of said main peak represented by equation (I):

$$0.1 X_{IS} - 1 \leq SMA \qquad (I)$$

wherein $X_{IS}$ represents an amount of a soluble content on xylene extraction at 25° C. in terms of percent by weight; and SMA represents a proportion of the area of said secondary peaks to that of said main peak in terms of percent.

8. A polypropylene resin composition as claimed in claim 7, wherein said soluble content on xylene extraction at 25° C. of said propylene block copolymer (A) has:
- (iii) an average propylene content (FP) according to the two-site model of from 30 to 70% by mole;
- (iv) a propylene content ($P_P$) of a copolymer ($P_H$) formed at an active site, at which propylene is predominantly polymerized in the two-site model, of from 50 to 80% by mole;
- (v) a proportion of said copolymer ($P_H$) in said soluble content on xylene extraction of from 0.20 to 0.60; and
- (vi) a block property (CSD) of from 1.0 to 2.5.

9. A polypropylene resin composition as claimed in claim 7, wherein said propylene block copolymer (A) is produced by a process comprising the steps of:

treating a solid catalyst comprising a magnesium compound, a titanium compound, a halogen-containing compound, and an electron-donating compound, with a titanium compound represented by formula TiXa·Yb, wherein X represents Cl, Br, or I; Y represents an electron-donating compound; a represents an integer of 3 or 4; and b represents an integer of 3 or less;

washing said solid catalyst with a hydrocarbon to produce a modified polymerization catalyst; and conducting polymerization in the presence of said modified polymerization catalyst to produce said propylene block copolymer, said modified polymerization catalyst having:
- (1) a surface area of from 100 to 300 m²/g;
- (2) a pore volume of from 0.30 to 0.45 cc/g in a pore diameter range of from 2 nm to 40 nm;
- (3) a weight-average grain diameter of from 50 to 100 μm;
- (4) a percent proportion of grains having a grain diameter of not less than 123 μm of not more than 15% by weight; and
- (5) a percent proportion of grains having a grain diameter of not more than 87 μm of not less than 35% by weight.

* * * * *